US008833308B1

(12) United States Patent  
Patterson

(10) Patent No.: US 8,833,308 B1
(45) Date of Patent: Sep. 16, 2014

(54) PET DOOR FLUID/POWDER APPLICATOR DEVICE

(76) Inventor: Jack W. Patterson, Kerrville, TX (US)

( * ) Notice: Subject to any disclaimer, the term of this patent is extended or adjusted under 35 U.S.C. 154(b) by 16 days.

(21) Appl. No.: 13/604,298

(22) Filed: Sep. 5, 2012

(51) Int. Cl.
*A01K 13/00* (2006.01)

(52) U.S. Cl.
USPC ........... 119/602; 119/621; 119/652; 119/659; 119/663; 119/603; 119/484

(58) Field of Classification Search
USPC ......... 119/484, 603, 602, 621, 622, 650, 651, 119/652, 656–663, 605, 672
See application file for complete search history.

(56) References Cited

U.S. PATENT DOCUMENTS

| 944,072 | A | * | 12/1909 | Buffum | 119/672 |
| 1,078,267 | A | * | 11/1913 | Edwards | 119/659 |
| 1,162,487 | A | * | 11/1915 | Ide | 119/663 |
| 1,191,791 | A | * | 7/1916 | Ide | 119/663 |
| 1,269,725 | A | * | 6/1918 | May | 119/663 |
| 1,290,753 | A | * | 1/1919 | Johnson | 119/663 |
| 1,731,181 | A | * | 10/1929 | Shimp | 119/658 |
| 1,933,071 | A | * | 10/1933 | Reins et al. | 119/658 |
| 2,814,273 | A | * | 11/1957 | Dickens, Sr. | 119/662 |
| 2,835,225 | A | * | 5/1958 | Cline | 119/659 |
| 3,538,891 | A | * | 11/1970 | Williams | 119/658 |
| 3,902,461 | A | * | 9/1975 | Cortner, Jr. | 119/661 |
| 4,799,456 | A |   | 1/1989 | Young |  |
| 5,027,747 | A |   | 7/1991 | Talley |  |
| D407,500 | S |   | 3/1999 | Gribble |  |
| 2008/0047500 | A1 | * | 2/2008 | Conway | 119/652 |
| 2009/0031965 | A1 |   | 2/2009 | Campbell |  |
| 2011/0232579 | A1 | * | 9/2011 | Clayson | 119/622 |

* cited by examiner

*Primary Examiner* — Andrea Valenti
(74) *Attorney, Agent, or Firm* — Crossley Patent Law; Micah C. Gunn

(57) ABSTRACT

A pet door fluid/powder applicator device disposed upon the bottom of the flap of a typical pet door. The pet door fluid/powder applicator device includes at least one roller volubly disposed on an underside of a chamber. At least one interior cavity is disposed within the chamber. The cavity is configured to store fluid/powder in contact with a first portion of the roller. The fluid/powder is applied to the hide of an animal as the animal is caused to contact and rotate the at least one roller of the rollers. Thus, whenever the animal moves through the pet door, a dosage of the fluid/powder containing a desired active ingredient is applied to the animal.

1 Claim, 4 Drawing Sheets

PET DOOR FLUID/POWDER APPLICATOR DEVICE

BACKGROUND OF THE INVENTION

Various types of fluid/powder applicator devices for use with animals are known in the prior art. However, what is needed is a pet door fluid/powder applicator device disposed upon the bottom of the flap of a typical pet door, said pet door fluid/powder applicator device including at least one roller volubly disposed on an underside of a chamber, at least one interior cavity disposed within said chamber, said cavity configured to store fluid/powder additional thereto in contact with a first poriton of the roller, wherein said fluid/powder is applied to the hide of an animal as said animal is caused to contact the at least one roller, and rotate said roller thereby, whenever said animal moves through the pet door, whereby a dosage of the fluid/powder containing a desired active ingredient is applicable to the animal.

FIELD OF THE INVENTION

The present invention relates to a pet door fluid/powder applicator device, and more particularly, to a pet door fluid/powder applicator device disposed upon the bottom of the flap of a typical pet door, said pet door fluid/powder applicator device including at least one roller volubly disposed on an underside of a chamber, at least one interior cavity disposed within said chamber, said cavity configured to store fluid/powder additional thereto in contact with a first portion of the roller, wherein said fluid/powder is applied to the hide of an animal as said animal is caused to contact the at least one roller, and rotate said roller thereby, whenever said animal moves through the pet door, whereby a dosage of the fluid/powder containing a desired active ingredient is applicable to the animal.

SUMMARY OF THE INVENTION

The general purpose of the pet door fluid/powder applicator device, described subsequently in greater detail, is to provide a pet door fluid/powder applicator device which has many novel features that result in a pet door fluid/powder applicator device which is not anticipated, rendered obvious, suggested, or even implied by prior art, either alone or in combination thereof.

There are many reasons to consistently apply fluid/powder dermally to a household pet. Pets are susceptible to vector borne illnesses, such as Lyme disease, ehrlichiosis, Rocky Mountain Spotted Fever, among other such diseases acquirable by exposure to vectors in the outdoors. Acarids, well known vectors for many diseases and zoonoses, are readily transported into the home upon a household pet whence they may contact, and thusly infect, humans. Many of the diseases carried by acarids are difficult to diagnose and can present serious health issues and chronic wasting of both animals and humans. Whereupon many repellants exist on the market today devised to ward off such vectors, and the associated diseases (many of which are zoonotic). A regular dose of such repellant is advisable to ensure infection free pets and to limit the exposure of members of the household to vectors inadvertently brought into the home upon a household pet.

Many household pets are also on other types of medication which require a regular dose schedule. It is an object, then, of the present device to enable a repeatable application of a fluid/powder to an animal automatically. It should be noted that, for the purposes of this specification, the term "fluid/powder" is taken to include all spreadable phases, mixtures, liquids, colloids, gels, foams, powders, and other phase states of a fluid/powder, material, or active ingredient applicable to an animal in the form and manner described in this specification. It should also be realized that additional fluid/powders are usable with the present device, including deodorizers, shampoos, soaps, conditioners, dander treatments and other cosmetics, as desired.

The invention, then, includes a chamber disposed upon the bottom of the flap of a typical pet door, said chamber disposed with at least one internal cavity configured to house fluid/powder additional thereto. At least one roller is rotatably disposed upon an underside of the chamber. The at least one roller has a first portion disposed within the at least one interior cavity and a second portion disposed protruding outwardly from the chamber whereby an animal using the pet door is caused to contact the at least one roller as said animal moves through the pet door. As the animal contacts the at least one roller when entering or exiting through the pet door, the at least one roller, volubly disposed upon the chamber, is caused to rotate, and the first portion is therefore turned from within the interior cavity, wherein said portion has been in contact with the fluid/powder therein disposed, and the first portion then applies a dose of the fluid/powder to the hide of the animal passing through the pet door.

Thusly, each time the animal uses the pet door, a dose of fluid/powder containing a desired medication or active ingredient is applied to the animal, whereby, for example, tick repellant is repeatedly applicable to the hide of the animal to maintain a desired dosage over time irrespective of a pet owner applying said tick replant (or other medication, or fluid/powder) directly to the animal.

A number of alternate embodiments are disclosed in this specification. A first embodiment includes a plurality of rollers serried in a first row and a second row along a respective first side and a respective second side of the chamber, proximal to the underside of said chamber. Each of the plurality of rollers is considered to be generally spherical, but the embodiment should not be considered limited by the spherical shape of the rollers. For example, a plurality of generally cylindrical rollers disposed in like manner is considered.

A second embodiment includes a hemi-cylindrical chamber having a cylindrical roller disposed on the underside of the chamber. The cylindrical roller is volubly disposed upon the underside of the chamber and is caused to rotate when an animal moves through the pet door in like manner as previously described. A third embodiment includes a chamber having a sector cross-section wherein two interior cavities are disposed on either side of a vertical partition. Each interior cavity is configured to house a fluid/powder, and can be used for housing different fluid/powders, as desired. Two cylindrical rollers are disposed at either end of the arc defining the underside of the chamber. In like manner as previously described, each of the two cylindrical rollers is caused to contact an animal passing through the pet door when the animal enters and respectively exits by means of the pet door.

Thus has been broadly outlined the more important features of the present pet door fluid/powder applicator device so that the detailed description thereof that follows may be better understood and in order that the present contribution to the art may be better appreciated.

Objects of the present pet door fluid/powder applicator device, along with various novel features that characterize the invention are particularly pointed out in the claims forming a part of this disclosure. For better understanding of the pet door fluid/powder applicator device, its operating advantages

BRIEF DESCRIPTION OF THE DRAWINGS

Figures

DETAILED DESCRIPTION OF THE DRAWINGS

Figure 1:
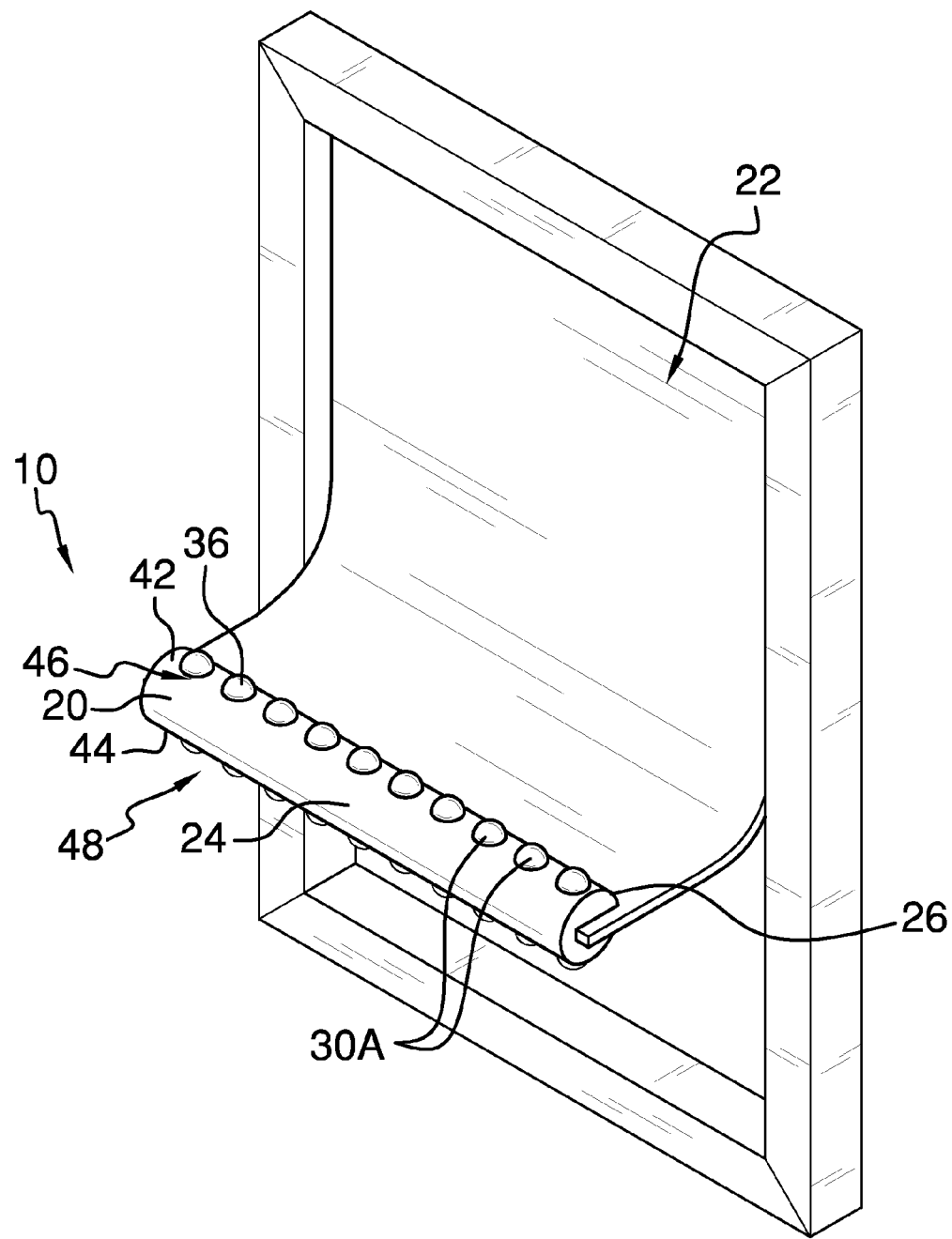
FIG. 1 is an isometric view of an embodiment.

With reference now to the drawings, and in particular FIGS. 1 through 7 thereof, example of the instant pet door fluid/powder applicator device employing the principles and concepts of the present pet door fluid/powder applicator device and generally designated by the reference number 10 will be described.

The pet door fluid/powder applicator device 10 includes a chamber 20 disposed upon the lower section of a pet door 22, said chamber 20 having an underside 24 and an upper side 26. At least one interior cavity 28 is disposed within the chamber 20, said interior cavity 28 disposed along the length of the chamber 20.

At least one roller 30A, 30B, 30C is rotatably disposed upon the chamber 20, each of said at least one roller 30A, 30B, 30C configured to volubly dispense fluid/powder 32 (such as medication) stored within the interior cavity 28 when each of said at least one roller 30A, 30B, 30C is rotated. Each of the at least one roller 30A, 30 B, 30C is disposed with a first portion 34 disposed within the interior cavity 28 and a second portion 36 disposed outwardly protruding from the chamber 20. Each of the at least one roller 30A, 30 B, 30C is rotatable whereby the first portion 34 is rotated out from the interior cavity 28 and the second portion 36 is rotated therein, whereby a fluid/powder 32 (such as medication) disposed within the interior cavity 28 is translocatable upon the at least one roller 30A, 30 B, 30C when said roller 30A, 30 B, 30C is rotated.

It should be noted that the term "fluid/powder" as used in this specification is intended to include gels, foams, liquids, colloids, powders, and other spreadable phases, mixtures, commixtures, states, and substances, whereby a medication or other ingredient is dispensable as in the manner herein described.

At least one aperture 38 is disposed proximal the upper side 26 of the chamber 20, each of the at least one aperture 38 in open communication with each of the at least one interior cavity 28. The at least one interior cavity 28 is fillable with a desired fluid/powder (such as a specific medication, for example) through the at least one aperture 38. To sealingly close the at least one aperture 38, at least one fill cap 40 is removably disposed upon each of said at least one aperture 38, said at least one fill cap 40 configured to sealingly close the chamber 20 when secured in a closed position.

Fluid/powder 32 housed within the at least one interior cavity 28 is therefore dispensable to the hide of an animal (not shown) using the pet door 22 when each of the at least one roller 30 is rotated by passing contact with the animal using the pet door 22.

Figure 2:
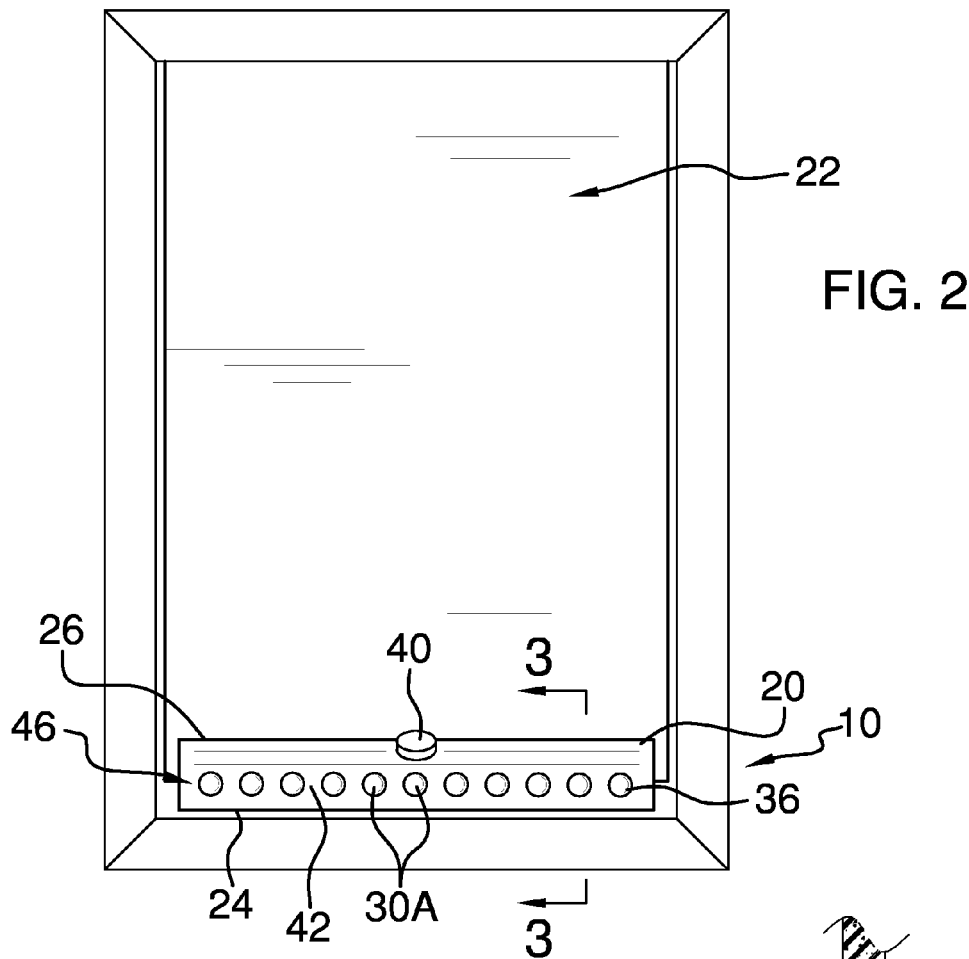
FIG. 2 is a front view of an embodiment.
Figure 3:
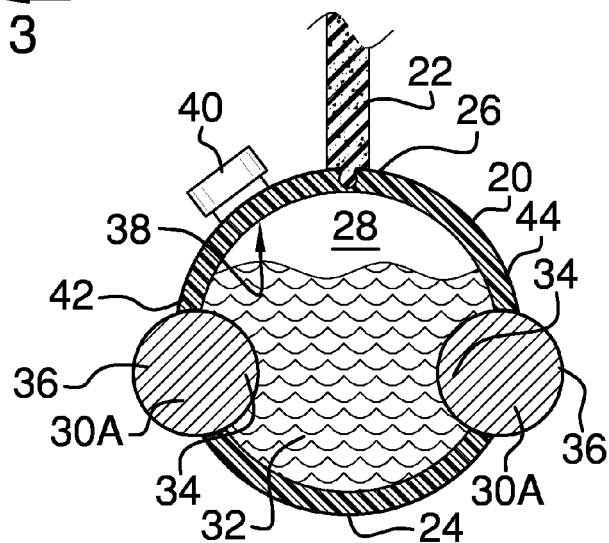
FIG. 3 is a cross section view of an embodiment taken along the line 3-3 of FIG. 2.

In an embodiment illustrated in FIGS. 1, 2, and 3, the chamber 20 is generally cylindrical and includes a first side 42 and a second side 44. A plurality of rollers 30A is disposed serried along a first row 46 and a second row 48, said first row 46 disposed along the first side 42 of the chamber 20 and the second row 48 disposed along the second side 44 of the chamber 20 whereby the first row 46 and the second row 48 contact the hide of an animal when said animal uses the pet door 22 entering from a respective first direction and a respective second direction.

Figure 4:
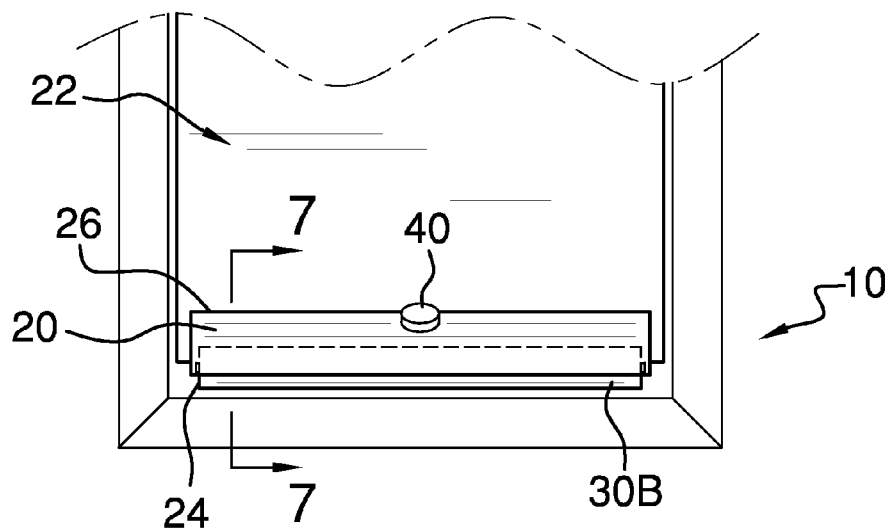
FIG. 4 is a front view of an alternate embodiment.
Figure 7:
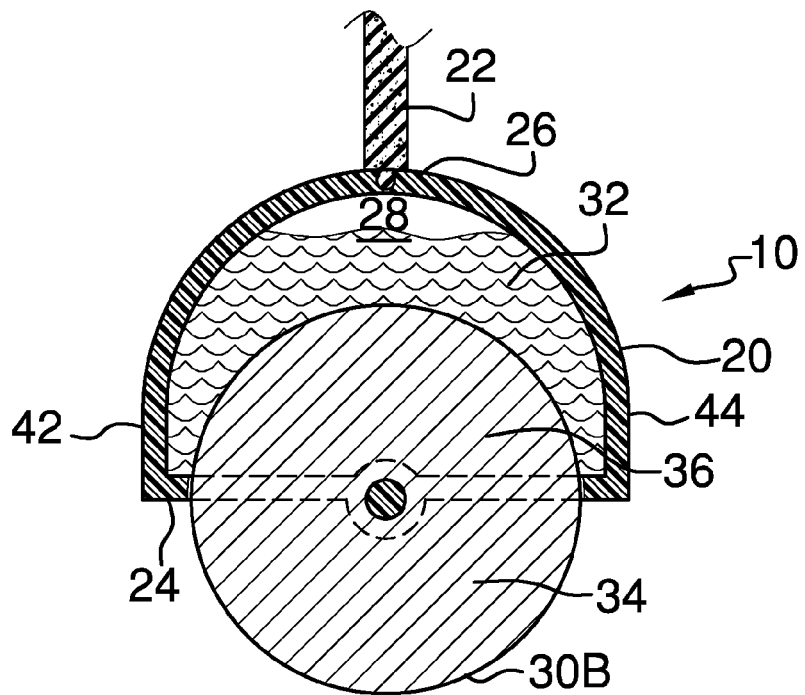
FIG. 7 is a cross section view taken along the line 7-7 of FIG. 4.

In an embodiment illustrated in FIGS. 4 and 7 the at least one roller 30A, 30 B, 30C comprises a cylindrical roller 30B rotatably disposed on the underside 24 of the chamber 20. The chamber 20 is considered to be generally hemi-cylindrical, with a flattened underside 24 (see FIG. 7). The roller 30B is volubly engaged when an animal uses the pet door 22 and fluid/powder 32 within the chamber 20 is dispensed to the hide of said animal.

Figure 5:
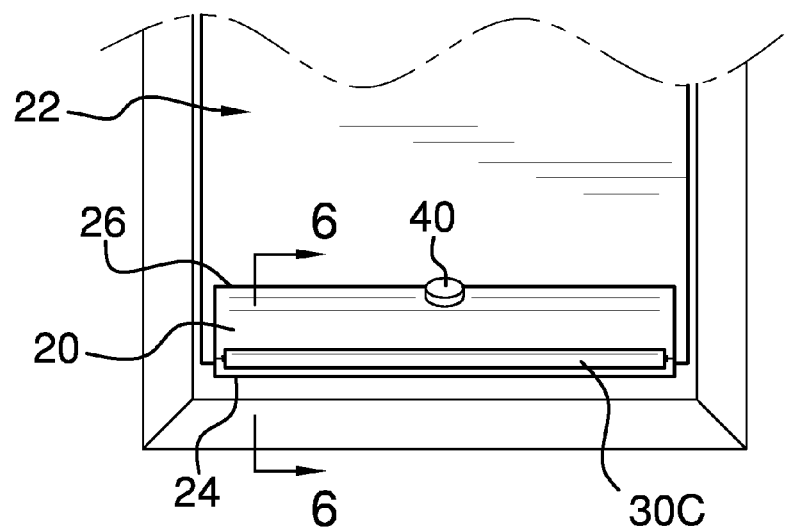
FIG. 5 is a front view of an alternate embodiment.
Figure 6:
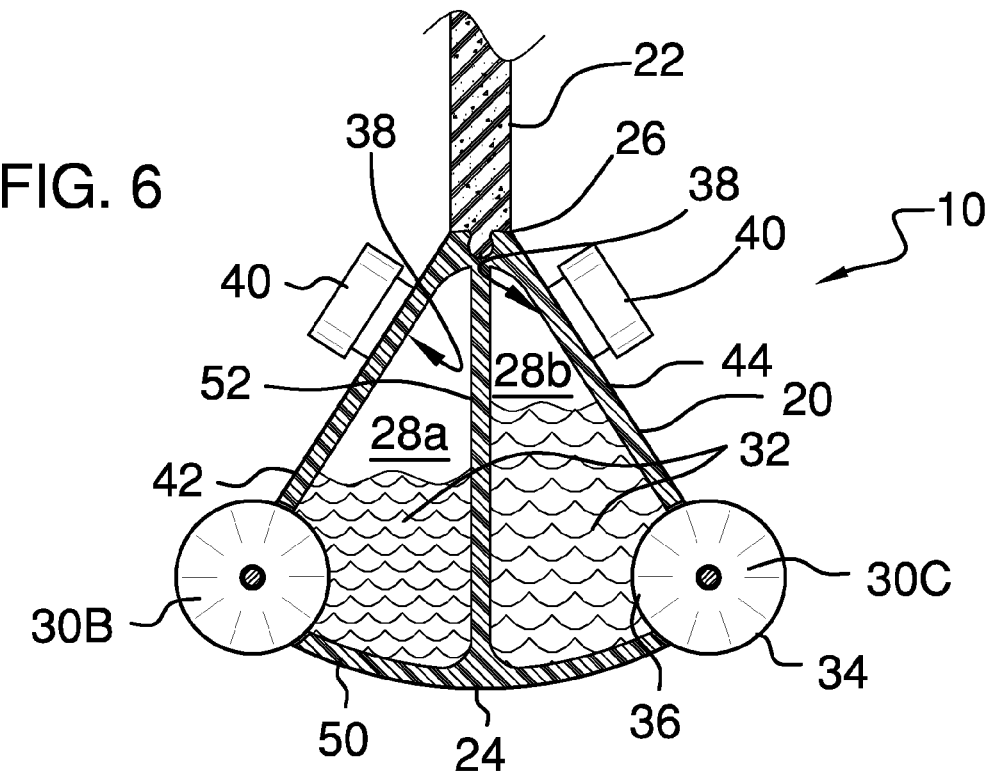
FIG. 6 is a cross section view taken along the line 6-6 of FIG. 5

In an embodiment illustrated in FIGS. 5 and 6 the chamber 20 has a cross-section comprising a sector (see FIG. 6) and the at least one roller 30A, 30 B, 30C comprises two cylindrical rollers 30C disposed at the extremes of the arc 50 of said sector along the underside 24 of the chamber 20. A vertical partition 52 separates each of a first interior cavity 28A and a second interior cavity 28B wherein separate fluid/powders are containable, as desired. Each of the two cylindrical rollers 30C is volubly engaged by an animal entering through the pet door in either direction respectively, and fluid/powder 32 housed within the interior cavity 28 is thusly likewise applied to the hide of the animal as it passes through the pet door.

What is claimed is:

1. A pet door fluid/powder applicator device comprising:
   a chamber disposed upon the lower section of a pet door, said chamber having an underside and an upper side;
   at least one interior cavity disposed within the chamber, said interior cavity disposed along the length of the chamber;
   at least one roller horizontally rotatably disposed upon the chamber, each of said at least one roller configured to volubly dispense fluid/powder stored within the cavity when each of said at least one roller is rotated;
   at least one aperture disposed in the upper side of the chamber, each of the at least one aperture in open communication with each of the at least one interior cavity; and
   at least one fill cap removably disposed upon each of said at least one aperture, said at least one fill cap configured to sealingly close the chamber;
   wherein fluid/powder housed within the at least one interior cavity is dispensable to the hide of an animal using the pet door when each of the at least one roller is rotated by passing contact with the animal using the pet door;
   wherein the chamber has a cross-section comprising a sector and the at least one roller comprises two cylindrical rollers horizontally disposed at the extremes of the arc of said sector along the underside of the chamber whereby each of the two rollers is volubly engaged by an animal entering through the pet door in either direction respectively;
   wherein a vertical partition separates each of a first interior cavity and a second interior cavity into two self contained cavities wherein separate fluid/powders are separably containable, and each of the two cylindrical rollers is volubly engaged by an animal entering through the pet door in either direction respectively, and each of said separate fluid/powders housed within each of the first and second interior cavities is applied to the hide of an animal as said animal passes through the pet door in each respective direction.

\* \* \* \* \*